United States Patent

[11] 3,611,914

| [72] | Inventor | Ross C. Wood<br>433 California St., El Segundo, Calif. 90245 |
|---|---|---|
| [21] | Appl. No. | 858,077 |
| [22] | Filed | Sept. 15, 1969 |
| [45] | Patented | Oct. 12, 1971 |

[54] STEAK BROILER
8 Claims, 4 Drawing Figs.

[52] U.S. Cl............................................... 99/391,
99/400, 99/401, 99/427
[51] Int. Cl........................................................ A47j 37/07
[50] Field of Search....................................... 99/423,
422, 443, 324, 386, 389, 397, 398, 399, 400, 401,
390–392, 426, 427; 219/244, 469, 470, 471;
107/4, 58, 66

[56] References Cited
UNITED STATES PATENTS

| 2,354,100 | 7/1944 | Bowen............................ | 99/443 C X |
| 2,907,267 | 10/1959 | Lindsey.......................... | 99/389 X |
| 3,105,133 | 9/1963 | Norton............................ | 219/469 |
| 3,218,958 | 11/1965 | Reynolds........................ | 99/400 X |

*Primary Examiner*—Walter A. Scheel
*Assistant Examiner*—Arthur O. Henderson
*Attorney*—Hyman Jackman

ABSTRACT: An electric broiler for steaks and similar flat cuts of meat in which the broiling elements and the steaks rotate together about an axis so the flat sides of the steaks are continuously exposed to the heat of said elements during all positions thereof during broiling.

INVENTOR.
ROSS C. WOOD

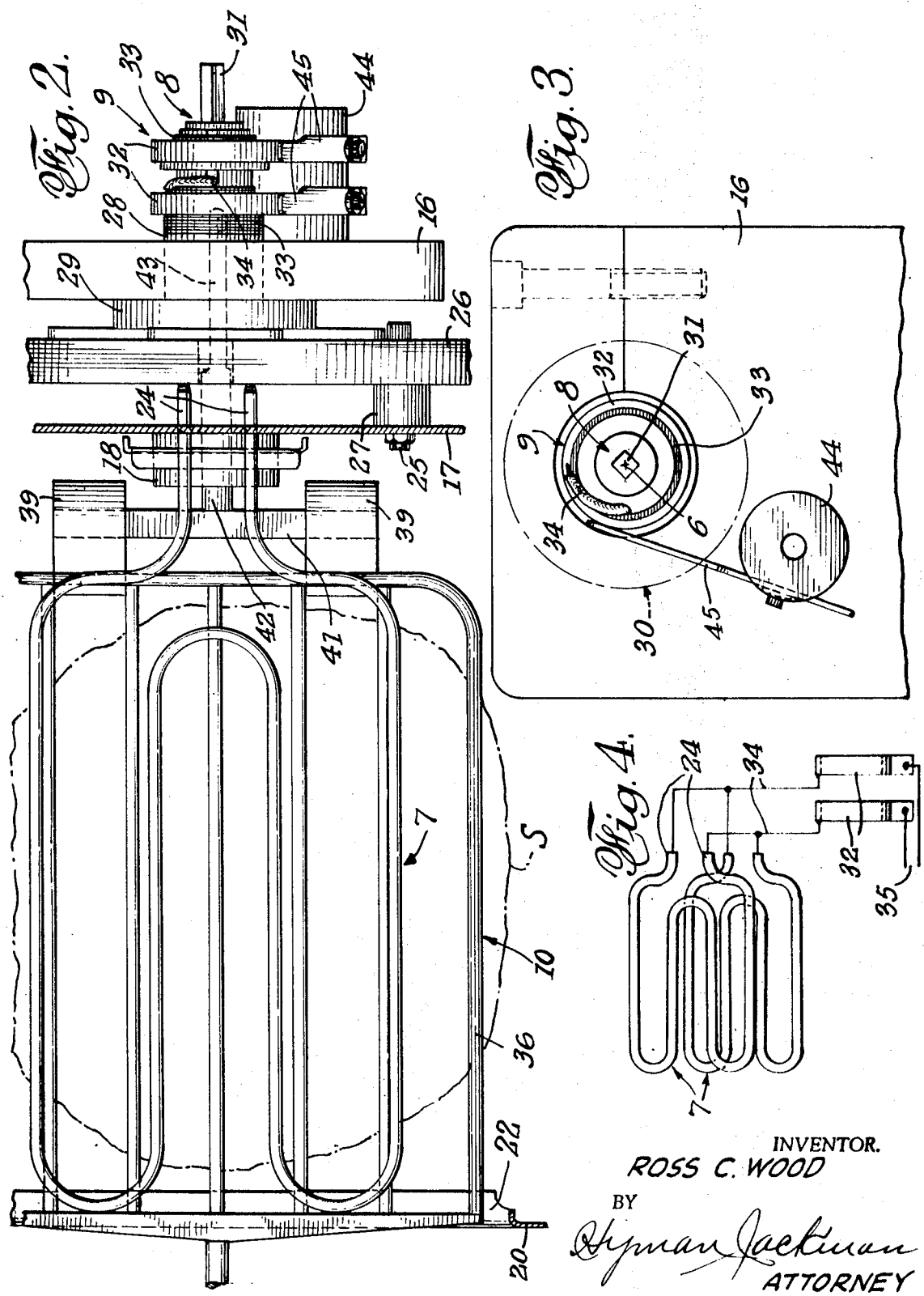

STEAK BROILER

BACKGROUND OF THE INVENTION

1. Field of the Invention

The cooking by broiling of flat cuts of meat of which steaks are the prime example.

2. Prior Art

Reference is made to U.S. Pat. No. 2,907,267, which discloses a cooker having a rotational axis that mounts a pair of discs each provided with heaters located between said axis and the peripheries of the discs. Meat holders, placed between the pairs of heaters, describe circular paths about the mentioned axis while being cooked.

SUMMARY OF THE INVENTION

The present broiler comprises, generally, a housing 5 mounted to turn about an axis 6, at least two, preferably parallel, heater elements 7, one on each side of said axis and parallel thereto, said elements being fixedly carried by the housing, means 8 to rotate the housing and heater together about said axis 6, means 9 to conduct electric current to said heater elements 7, and a meat-holding grill 10 separably connected to the means 8 and rotatable therewith, said grill freely fitting in space 22 and being disposed between and spaced from the heater elements 7, thereby continuously exposing the flat sides of the meat to the broiling heat of said elements during the cooking period.

An object of the invention is to provide means, as above characterized, to maintain uniformly applied broiling heat on a flat cut of meat while the same is in continuous rotation about an axis, thereby providing for uniform application of broiling heat to said meat.

Another object of the invention is to provide for rapid and, therefore, improved searing of the flat surfaces of the meat being broiled, thereby minimizing loss of the natural juices, and resulting in meat of improved flavor, taste and tenderness.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description, which is based on the accompanying drawings. However, said drawings merely show, and the following specification merely describes, one embodiment of the present invention, which is given by way of illustration or example only.

BRIEF DESCRIPTION OF THE DRAWINGS

In the drawings, like reference characters designate similar parts in the several views.

FIG. 2 is a fragmentary plan view, with portions of the housing removed to expose the interior.

FIG. 3 is a fragmentary end view as seen from the right end of FIG. 1.

FIG. 4 is a wiring diagram of the heating circuit.

DESCRIPTION OF THE PREFERRED EMBODIMENT

Figure 1:
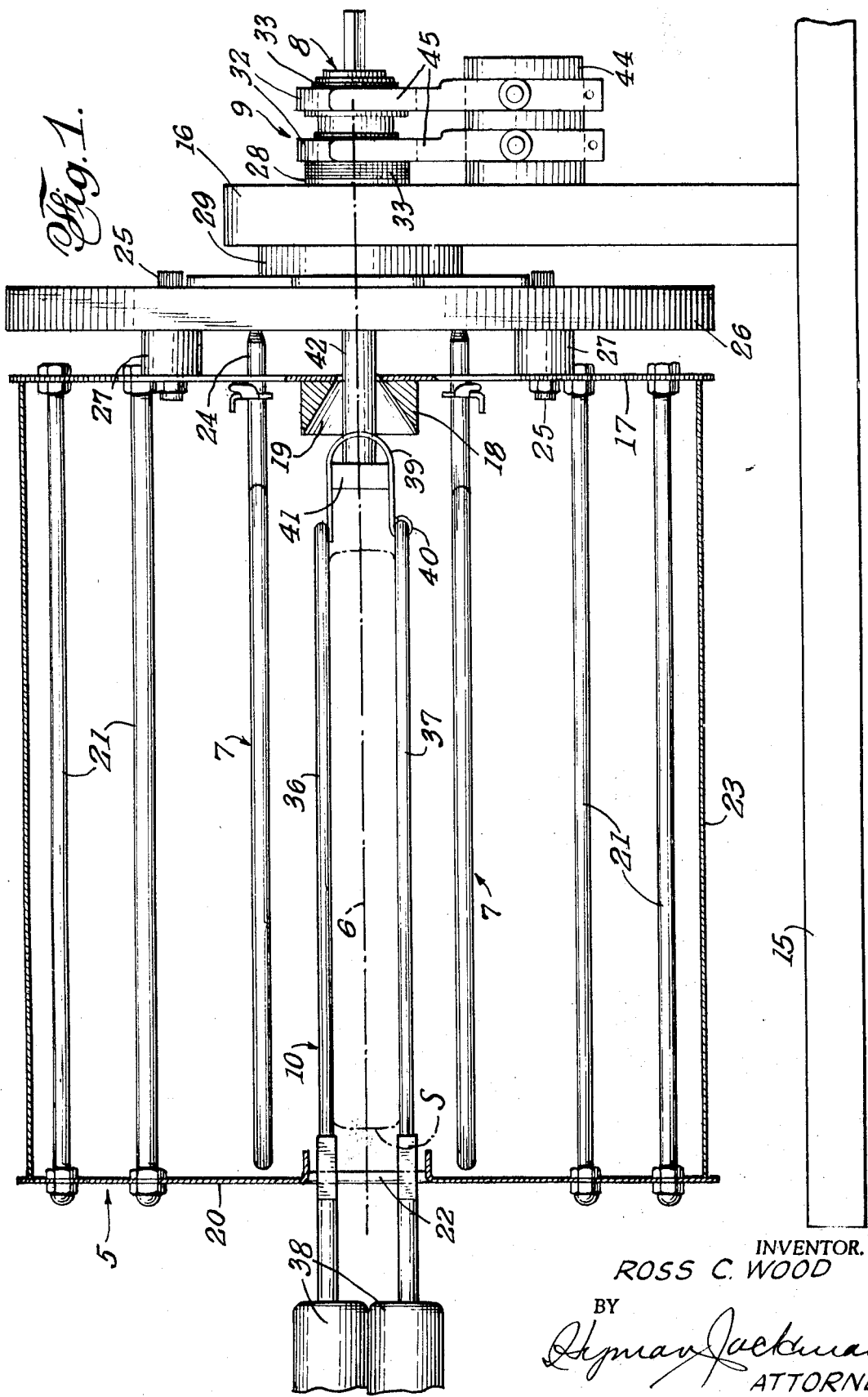
FIG. 1 is a side elevational view, partly in longitudinal section, of a steak broiler according to the present invention.

As best seen in FIG. 1, the above generally described component parts of the broiler may be mounted on a base plate 15, near one end of which is affixed a support bracket 16 for said components.

The housing 5 is shown as having a rear plate 17, the center of which is on the axis 6 and which, at said center, is provided with a fitting 18 having a forwardly directed, conical lead-in cavity 19. A front plate 20 is forwardly spaced by the plate 17 and is carried by the latter plate by means of connector rods 21. An elongated opening 22, centered on said axis 6, is provided in the plate 20, the same being of a length and width to freely accommodate the grill 10, as shown in FIGS. 1 and 2. A sheet metal cover 23 extends between the plates 17 and 20 around the connector rods 21, thereby forming an enclosure around the heater elements 7 to house the latter, and also serving to catch such drippings of juices that may occur during a broiling operation. Said cover may be of the wraparound type so it may be removed from time to time for cleaning of the housing.

The heater elements 7, in this case electric heaters, extend, at 24, through the rear plate 17 of the housing, and, as shown in FIG. 1, may be shaped in overall length and width so as to apply their heat to the opposite sides of a steak S disposed therebetween. The elements 7 are disposed in planar alignment with the elongated opening 22.

The above-described housing 5 is affixed, as by bolts 25, to a heat-insulating member 26, and is spaced from said member, as by spacers 27 through which the bolts 25 pass.

The means 8 comprises an arbor 28 that extends through and is rotatively mounted on the bracket 16, the same being centered on the axis 6. Said arbor has a flange 29 by which it is affixed to the insulating member 26. It will be clear that the housing and the members affixed thereto rotate with the arbor 8, and that rotation is brought about by any suitable motor 30 (FIG. 3) that has its output shaft connected to the end 31 affixed to said arbor.

The current-conducting means 9 is shown as comprising a pair of spaced slip rings 32 fixedly mounted on the arbor 28 but insulated therefrom by insulating collars 33. One of said rings 32, by means such as a heat-insulated and current-insulated conductor 34 that extends forwardly through the arbor, is connected to one of the ends 24 of both heating elements 7. The other of said rings 32, in the same manner, is connected to the other ends 24 of the heating elements. FIG. 4 shows the above heating circuit that is connected to a line 35. In the usual way, the motor 30 is operated from a separate electrical line.

The grill 10 is shown as comprising similar grid parts 36 and 37, each provided with a handle 38. The part 36 is shown as having bowed brackets 39 which terminate in eyes 40 that form aligned hinges for connecting the end of grid 37 to the comparable end of grid 36. The brackets are formed so as to hold the grids in spaced parallel relation, as in FIG. 1, the handles 38 being preferably formed to similarly space the handle end of the grids.

The width of the grid parts 36 and 37 is such as will enable the same to freely be introduced, hinged end first, into the housing 5 through the opening 22 thereof. The grill width should approximate that of the heater elements 7 and preferably be somewhat wider, as shown in FIG. 2.

At the hinged end of the grill, the same is shown with a cross bar 41, the same extending between the brackets 39 and being provided with an extension 42 that, when the grill is placed in the broiler, will pass through the lead-in cavity, through an opening in the insulating member 26, and into nonrotational engagement with the arbor 28. For that purpose, the extension has an end 43 that has a polygonal cross section, or such comparable form that will cause the grill, while removable, to be rotated with the housing 5 and all the above-described elements affixed thereto, especially the heater elements 7.

The heating current from line 35 may be brought to the slip rings in any usual manner. In this case, an insulator 44, affixed to the bracket 16, carries two brushes 45 which have engagement with the slip rings 32.

It will be evident from the foregoing that, with the elements 7 heating a steak clamped in a grill 10 and inserted in the broiler, both sides of the steak are being uniformly broiled by the elements 7, and that such juices that may be released from the steak are released evenly, thereby insuring uniform broiling of the steak throughout its area.

Without invention, the line 35 may be timed, as desired.

While the foregoing has illustrated and described what is now contemplated to be the best mode of carrying out the invention, the construction is, of course, subject to modification without departing from the spirit and scope of the invention.

Having thus described the invention, what is claimed and desired to be secured by Letters Patent is:

1. A steak broiler comprising;
   a. stationary vertical support means;
   b. a heater assembly mounted for rotation on said vertical support means and extending horizontally therefrom, said assembly formed of two elongated heater elements spaced on either side of the axis of rotation to define a substantially horizontal space therebetween; and
   c. a steak-holding grill removably received in said space between said heater elements and rotatable with said heater assembly.

2. A steak broiler according to claim 1 provided with separable means connecting the heater assembly and the grill.

3. A steak broiler according to claim 2:
   said vertical support having an opening therein,
   a rotational arbor extending through said opening and fixedly mounting said heater assembly, and
   means carried by the arbor and electrically connected to the heater to conduct heating assembly current to the elements of said heater during rotation of the arbor.

4. A steak broiler according to claim 3:
   the latter means comprising a pair of sliprings insulated from the arbor, and
   a pair of brushes carried by the support and electrically engaged with said sliprings, the brushes being connected to a current line.

5. A steak broiler according to claim 1 in which the grill comprises two hingedly connected flat grids, and the heater elements are flat and parallel.

6. A steak broiler according to claim 1 provided with a housing around the heater elements and rotatable therewith to collect juices released by the steak during broiling thereof.

7. A steak broiler according to claim 6 including means fixedly connecting the heater assembly and the housing.

8. A steak broiler according to claim 7 in which the housing is provided with a wall having an opening through which the grill is adapted to be introduced between the heater elements.